Aug. 20, 1963   A. J. WEIS   3,101,023
MUSIC CHORD FINDER
Filed Dec. 7, 1961   2 Sheets-Sheet 1
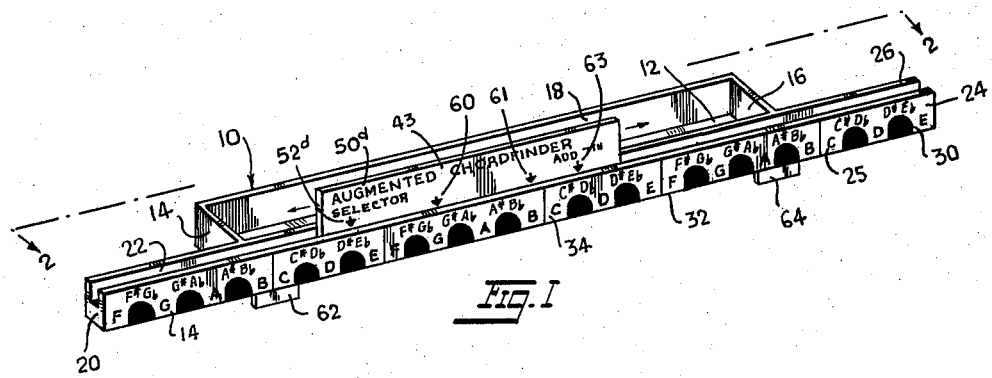
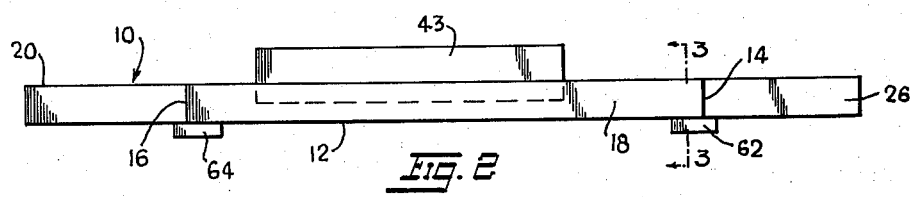
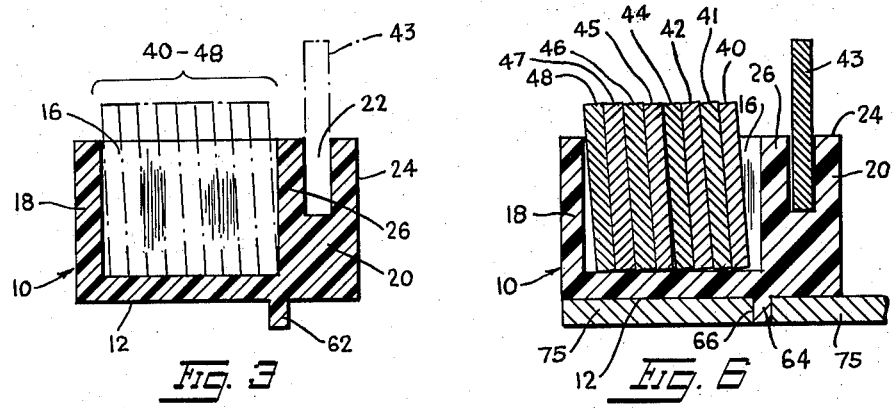
INVENTOR.
ANDREW J. WEIS
BY
ATTORNEY Aug. 20, 1963 — A. J. WEIS — 3,101,023
MUSIC CHORD FINDER
Filed Dec. 7, 1961
2 Sheets-Sheet 2
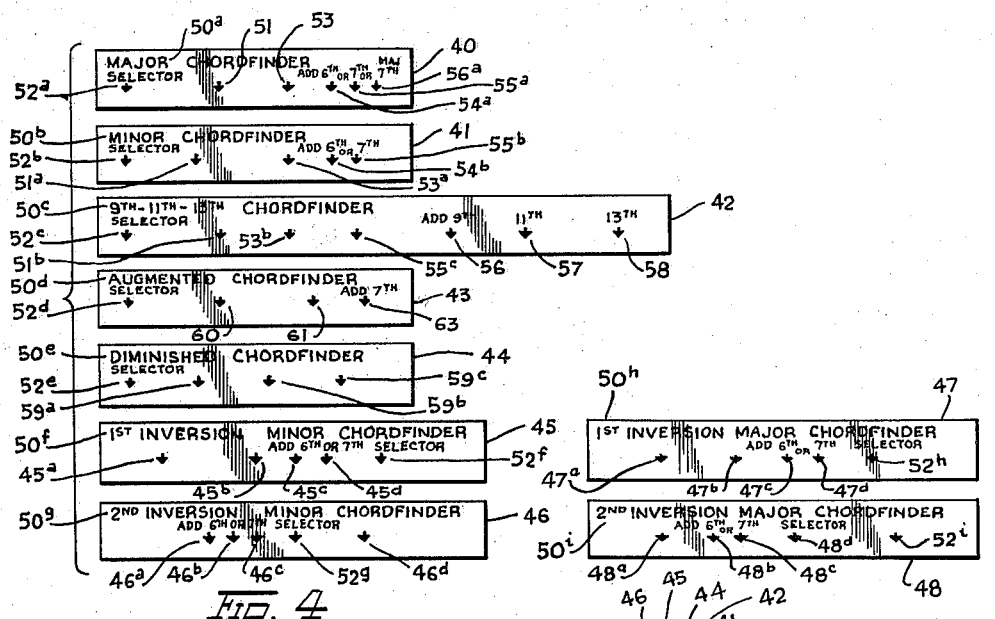
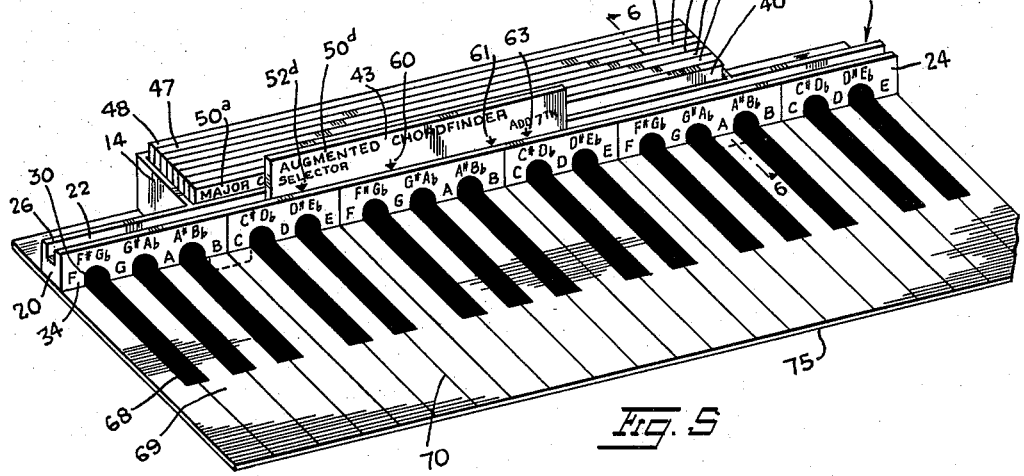
INVENTOR.
ANDREW J. WEIS
ATTORNEY

United States Patent Office 3,101,023
Patented Aug. 20, 1963

3,101,023
MUSIC CHORD FINDER
Andrew J. Weis, 137 Summit Ave., Mount Vernon, N.Y.
Filed Dec. 7, 1961, Ser. No. 157,662
1 Claim. (Cl. 84—482)

This invention concerns a music chord indicator.

The invention includes a tray adapted to contain a plurality of slides each of which is a flat rigid strip marked with arrows spaced predetermined distances apart, corresponding to the spacing of notes in chords of the tempered scale. The several slides are keyed to major, minor, augmented, diminished, 6th—7th—9th—11th—13th chords and 1st and 2nd inversions of major, minor, augmented and diminished chords. The slides could be made to be applicable to major, minor chromatic and whole tone scales as well as major, minor, perfect, augmented, and diminished intervals.

The tray has a front rail in which is a groove adapted to receive any one of the slides. The rail has its front surface divided into successive note positions extending over two or more octaves. The spacing of the notes corresponds to the spacing of keys of an instrument with which the device is adapted to be used, such as a piano, organ, or other keyboard instrument. For practice purposes, there is provided a flat practice keyboard which is apertured to receive projections depending from the tray. The tray is thereby located on the keyboard with the note positions on the rail registering with key positions on the practice keyboard.

It is one object of the invention to provide a device which can be disposed on a keyboard of a musical instrument to locate notes of selected chords instantly.

Still another object is to provide a device of the character described, with an associated practice keyboard having key positions corresponding to and registering with note or key positions upon the device.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

FIG. 1 is a perspective view of the tray with one slide thereon.

FIG. 2 is a rear view of the tray and slide of FIG. 1.

FIG. 3 is a sectional view on an enlarged scale taken on line 3—3 of FIG. 2.

FIG. 4 is a plan view of a plurality of slides according to the invention.

FIG. 5 is a perspective view of a tray, slide and practice keyboard assembly.

FIG. 6 is a sectional view on an enlarged scale taken on line 6—6 of FIG. 5.

Referring first to FIGS. 1-3, 5 and 6, there is shown a tray 10 which includes a flat bottom 12, rectangular end walls 14, 16, a rectangular rear wall 18 and a front rail 20 defining an elongated, open top box. The rail is somewhat longer than the box. The rail 20 has a groove 22 formed in its top and extending parallel to the front and rear walls 24, 26 of the rail for the full length of the rail. On the exposed front wall 24 of the rail are successive letters 25 indicating successive chromatic notes. Spaced black areas 30 on the front wall extend to the bottom edge 32 of the wall. The widths of the black areas correspond to the widths of black keys of any keyboard instrument with which the device is to be used. The white spaces 34 between the black areas correspond to locations of white keys. The letters 25 on the front wall correspond to the white spaces and black areas. For example, letters F, G, A, B, C, D and E represent white piano keys and these letters are located in white spaces on wall 24. Letters F#, G#, A#, C# and D# correspond to black piano keys and the black areas are identified with these letters accordingly.

FIGS. 4 and 6 show the slides 40-48 to best advantage. These slides are thin rigid strips of metal, plastic, hardboard or the like, wider than the depth of the tray and groove 22. The strips are elongated and rectangular and on their front faces are chord identifications $50^a$–$50^l$. A plurality of spaced arrows appear on each slide. One arrow $52^a$–$52^i$ on each slide is designated the Selector. Other arrows 51 and 53 correspond to locations of notes of the particular chord. The major chord slide 40 has three additional arrows $54^a$, $55^a$ and $56^a$ indicating 6th, 7th and major 7th note extensions of the major chord. The minor chord slide 41 has two arrows $54^b$ and $55^b$ indicating 6th and 7th note extensions of the minor chord, in addition to arrows $51^a$, $53^a$. Slide 42 is the 9th—11th—13th chord selector slide and has arrows 56, 57 and 58 indicating locations of the 9th, 11th and 13th note extensions of the major chord in addition to arrows $51^b$, $53^b$ and $55^c$. Slide 43 is the augmented chord selector and has an arrow 63 locating the 7th note extension of the chord in addition to arrows 60 and 61. Slide 44 is the diminished chord and has four arrows. Arrow $52^e$ is the key selector and the other three arrows $59^a$, $59^b$, $59^c$ are spaced to correspond to the locations of the notes of a diminished chord. Slides 45 and 46 have arrows $45^a$–$45^d$ and $46^a$–$46^d$ employed for locating first and second inversions of minor chords in addition to 6th and 7th extensions. Slides 47 and 48 have arrows $47^a$–$47^d$ and $48^a$–$48^d$, respectively, locating first and second inversions of major chords in addition to 6th and 7th extensions.

Two flat projections 62, 64 are formed on the underside of the tray and extend downwardly. These projections are adapted to engage in correspondingly spaced slots 66 formed in a practice keyboard 75 shown in FIGS. 5 and 6. The practice keyboard is a flat rectangular board or sheet of metal, plastic, fiberboard or other suitable rigid material. Its upper surface has black spaced stripes 68 representing black keys of a piano or other keyboard instrument. White spaces 69 located between line 70 extending forwardly from the stripes 68, represent white keys of a piano or other keyboard instrument. The practice keyboard thus simulates a keyboard of a musical instrument.

When the projections are inserted in the slots 66, the tray 10 is properly located with respect to the practice keyboard. The white spaces 34 on the front wall 24 align with the white spaces 69 and the black areas 30 align with the black key stripes 68. Slides 40-48 are supported in the tray and are exposed for instant selection.

Suppose it is desired to locate the notes of a chord, such as the E♭7 augmented chord. The augmented chord finder slide 43 will be selected located in groove 22 of the rail as shown in FIG. 5. The selector arrow $52^d$ will be aligned with E♭ on the front wall of the rail for the particular octave desired. Arrows 60, 61 and 63 will be found pointing to notes G, B and D♭ on the rail. The corresponding white and black keys on the keyboard will then be located and may be studied by the student. If the tray is located on the keyboard of a piano, the keys of the chord can be played as indicated by the arrows on the slide.

The invention has the particular advantage that any slide can be inserted in the rail for location of any type of chord, and any slide can be moved along the rail for instant selection of the chords of any selected key of any octave. No knowledge of basic music theory is required. The player or student need not even have the ability to read notes. The proper keys to be played are pointed out by the arrows on the slide. The white spaces and black areas on wall 24 and keyboard 75 may be differently colored instead of white and black.

To find a major chord, the major chord finder slide 40 is used. For example, suppose the C major chord is to be located. Place the major chord finder slide 40 in the slot 22 of the rail and move it until the selector arrow $52^a$ is located above the desired C on the front of the rail. Below the letter C will be the white space on keyboard 75 representing the white key C. The arrows 51, 53 will point to keys E and G. The three notes C, E and G constitute the C major triad or C major chord. If the tray is located on a keyboard of a piano, the same results will be obtained.

To find a minor chord such as F minor chord, place the minor chord finder slide 41 in slot 22 and move the slide until the selector arrow $52^b$ is located above a selected F white space. The other arrows $51^a$ and $53^a$ will point to A♭ (black key) and C (white key). The three notes F, A♭ and C make up the F minor chord.

Diminished chords are found in the same manner as described for the major, minor and augmented slides described above. It will be noted that diminished chords contain four notes instead of three. The C diminished chord, for example, would be found to be located by the arrows at C, E♭, F# and A.

Ninth chords have five notes and five keys would be found with slide 42. C–9th, for example, would include C, E, G, B♭ and D. Eleventh chords have six notes. C–11th, for example, would be found to include C, E, G, B♭, D and F. Thirteenth chords have seven keys. C–13th, for example, would be found to include C, E, G, B♭, D, F and A.

Sixth and seventh chord extensions in the major and minor chords are found with the major and minor chord slides 40 and 41. Arrows $54^a$, $55^a$, and $56^a$ point out the sixth, seventh and major 7th notes of the major chord on slide 40 and arrows $54^b$ and $55^b$ point out the sixth and seventh notes of the minor chord on the minor chord finder slide 41.

Below is a summary of the slides to be used in finding various chords all based on the key of C:

| Major | Minor | 9th—11th—13th | Augmented | Diminished |
|---|---|---|---|---|
| C | Cm | C9 | C aug. | C dim. |
| C6 | Cm6 | C11 | C aug. 7 | |
| C7 | Cm7 | C13 | | |
| C Major 7 | | | | |

The invention will be found of especial usefulness to students, teachers, and others desiring to acquire rapid familiarity with the notes comprising the most generally employed music chords, in all tempered scales. The device is compact, inexpensive to manufacture and readily portable.

While I have illustrated and described the preferred embodiment of my invention, it is to be understood that I do not limit myself to the precise construction herein disclosed and that various changes and modifications may be made within the scope of the invention as defined in the appended claim.

Having thus described my invention, what I claim as new and desire to secure by United States Letters Patent is:

Apparatus for teaching piano playing comprising a flat, rigid, rectangular sheet marked on the top surface thereof with a series of differently colored areas representing positions of keys of a piano keyboard, said sheet having a closed guide slot at each end thereof rearwardly of the colored areas, a tray device supported on and removably fixed to the top surface of the sheet behind said marked areas, said device consisting of an elongated vertically disposed rail having a groove along the top surface thereof for receiving and supporting a slide releasably, a box-like member integral with said rail at the rear thereof and centrally thereof, said member having end walls and a rear wall, the rail constituting the front wall thereof, said member being open at the top to receive and removably store slides for selective and individual display in the groove of the rail, the top groove of said rail adapted to support a single slide, the front surface of said rail being divided into a series of differently colored areas representing positions of keys on the keyboard, said slides each bearing spaced indicators corresponding in position to notes of chords, said indicators being spaced so as to locate notes of major, minor, augmented and diminished chords, chord inversions and chord extensions on the keyboard on the sheet, and projections depending from the bottom of said rail and extending through the slots in the sheet for removably interlocking said tray device in operative position on the sheet.

References Cited in the file of this patent

UNITED STATES PATENTS

| 1,811,865 | Rogers | June 30, 1931 |
| 2,280,593 | Maffei | Apr. 21, 1942 |

FOREIGN PATENTS

| 7,499 | Great Britain | 1902 |
| 899,582 | Germany | Dec. 14, 1953 |